United States Patent
Chung et al.

(10) Patent No.: US 9,148,038 B2
(45) Date of Patent: Sep. 29, 2015

(54) FUEL PUMP MOTOR

(75) Inventors: Chun Yick Chung, Hong Kong (CN); Chun Kit Cheung, Hong Kong (CN); Duncan Yiu Lung Wong, Hong Kong (CN); James Ching Sik Lau, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 368 days.

(21) Appl. No.: 13/405,065

(22) Filed: Feb. 24, 2012

(65) Prior Publication Data

US 2012/0219438 A1    Aug. 30, 2012

(30) Foreign Application Priority Data

Feb. 25, 2011    (CN) ...................... 2011 2 0048928 U

(51) Int. Cl.
| | |
|---|---|
| *H02K 7/04* | (2006.01) |
| *F04D 13/06* | (2006.01) |
| *H02K 5/12* | (2006.01) |
| *H02K 7/00* | (2006.01) |

(52) U.S. Cl.
CPC *H02K 7/04* (2013.01); *F04D 13/06* (2013.01); *H02K 5/12* (2013.01); *H02K 7/003* (2013.01)

(58) Field of Classification Search
CPC ............ F04D 13/06; H02K 1/24; H02K 5/12; H02K 7/0031
USPC ......... 417/423, 423.7; 464/180; 310/261.094, 310/261.1, 264, 216.094, 269, 216.074, 310/216.076, 216.077, 216.091, 216.092, 310/216.096, 233
See application file for complete search history.

(56) References Cited

U.S. PATENT DOCUMENTS

| | | | | |
|---|---|---|---|---|
| 4,477,226 | A | * | 10/1984 | Carreno ..................... 416/144 |
| 5,229,672 | A | * | 7/1993 | Iwaki .......................... 310/51 |
| 6,783,340 | B2 | * | 8/2004 | Dong ......................... 418/61.3 |
| 2004/0115077 | A1 | * | 6/2004 | Iwanari ...................... 417/423.3 |
| 2012/0133229 | A1 | * | 5/2012 | Jayasoma et al. ........ 310/156.01 |

FOREIGN PATENT DOCUMENTS

| | | | | |
|---|---|---|---|---|
| JP | 7184344 | | 7/1995 | |
| JP | 2001119906 A | * | 4/2001 | ............ H02K 15/16 |
| JP | 2004129437 | | 4/2004 | |
| JP | 2004129437 A | * | 4/2004 | ............ H02K 15/16 |
| WO | WO 2010106497 A2 | * | 9/2010 | |

OTHER PUBLICATIONS

JP2001119906A: English Translation of Specification and Orginal Document,Apr. 2001.*
JP2004129437A:English Translation of Specification and Orginal Document, Apr. 2004.*
Jayasoma et al., WO 2010106497 A2, English translation.*

* cited by examiner

*Primary Examiner* — Devon Kramer
*Assistant Examiner* — Jon Hoffmann
(74) *Attorney, Agent, or Firm* — Muncy, Geissler, Olds & Lowe, P.C.

(57) ABSTRACT

A motor for a fuel pump includes a rotor which includes a shaft, a rotor core and a commutator fitted on the shaft. The rotor core is formed by stacking together a plurality of aligned laminations and includes a plurality of salient poles arranged along a circumference thereof. A center line of gravity of the rotor deviates from a rotational axis of the rotor. The rotor core has a first groove in one of the poles close to the center line of gravity of the rotor. The first groove extends from a first axial end of the rotor core to an axial middle portion of the rotor core.

20 Claims, 4 Drawing Sheets

FUEL PUMP MOTOR

CROSS REFERENCE TO RELATED APPLICATIONS

This non-provisional patent application claims priority under 35 U.S.C. §119(a) from Patent Application No. 201120048928.9 filed in The People's Republic of China on Feb. 25, 2011.

FIELD OF THE INVENTION

This invention relates to a fuel pump, and in particular, to an electric motor for a fuel pump.

BACKGROUND OF THE INVENTION

A fuel pump typically has a housing, a motor received in the housing and an impeller driven by the motor. The impeller is rotated to drive fuel through the housing, and the motor. The motor has a rotor which includes a shaft, a rotor core fitted to the shaft, a commutator fitted to the shaft, and a plurality of windings wound around the rotor core. In order to improve the balance of the rotor, a groove is formed at a radially outermost surface of the rotor core by milling. Due to the characteristics of milling techniques, on one hand, the groove can only be formed on the outermost surface of the rotor core; on the other hand, a radial depth as well as a circumferential width of the groove varies along an axial direction of the rotor core, which causes undesired vortex flow when fuel flows through the motor.

Therefore, there is a need for an improved motor that can overcome the shortcomings described above.

SUMMARY OF THE INVENTION

Accordingly, in one aspect thereof, the present invention provides an electric motor comprising a stator and a rotor, the rotor comprising: a shaft having a mounting structure formed at one end thereof for connection to a load; a rotor core fitted to the shaft, the rotor core formed by stacking together a plurality of laminations and having a plurality of salient poles arranged along a circumference thereof; and a commutator fitted to the shaft; wherein the mounting structure causes a center line of gravity of the rotor to deviate from a rotational axis of the rotor, the rotor core defining a first hole in a first one of the poles, said first pole being closer to the center line of gravity of the rotor than at least one other pole, the first hole extending from a first axial end of the rotor core to an axial middle portion of the rotor core, the first hole being formed by aligning first cutouts formed in corresponding laminations before stacking.

Preferably, the first cutouts are formed in an edge of the laminations, and the first hole is an open hole forming a first groove in a radially outermost surface of the corresponding pole, the first groove has a constant radial depth and a constant circumferential width along the axial direction of the rotor core.

Preferably, the rotor core defines a plurality of winding slots between the poles, each winding slot has an opening at a radially outermost end thereof, and the circumferential width of the first groove is not more than a circumferential width of the opening of the winding slot.

Alternatively, the first cutouts of the laminations are in the form of a closed hole, and the first hole is a blind hole extending in the corresponding pole.

Preferably, each pole of the rotor core comprises a rectangular neck portion and an arced head portion adjoining a radially outer end of the neck portion, the first hole is defined in the head portion.

Preferably, the rotor core defines a second hole in a second one of the poles, said second pole being further from the center line of gravity of the rotor than the first pole, the second hole extending from a second axial end of the rotor core to an axial middle portion of the rotor core, the second hole being formed by aligning second cutouts formed in corresponding laminations before stacking.

Preferably, a sum of axial lengths of the first hole and the second hole is less than an axial length of the rotor core.

Preferably, the second cutouts are formed in an edge of the corresponding laminations, and the second hole is an open hole forming a second groove in a radially outermost surface of the corresponding pole, the second groove has a constant radial depth and a constant circumferential width along the axial direction of the rotor core.

Preferably, the rotor core defines a plurality of winding slots between the poles, each winding slot has an opening at a radially outermost end thereof, and the circumferential width of the second groove is not more than a circumferential width of the opening of the winding slot.

Alternatively, the second cutouts of the laminations are in the form of a closed hole, and the second hole is a blind hole extending in the corresponding pole.

Preferably, each pole of the rotor core comprises a rectangular neck portion and an arced head portion adjoining a radially outer end of the neck portion and the second hole is defined in the head portion.

According to a second aspect thereof, the present invention also provides a fuel pump comprising: a housing; a pump chamber received in the housing; an impeller received in the pump chamber; and an electric motor comprising a stator and a rotor, the rotor comprising: a shaft having a mounting structure formed at one end thereof for connection to the impeller; a rotor core fitted to the shaft, the rotor core formed by stacking together a plurality of laminations and having a plurality of salient poles arranged along a circumference thereof; and a commutator fitted to the shaft; wherein the mounting structure causes a center line of gravity of the rotor to deviate from a rotational axis of the rotor, the rotor core defining a first hole in a first one of the poles, said first pole being closer to the center line of gravity of the rotor than at least one other pole, the first hole extending from a first axial end of the rotor core to an axial middle portion of the rotor core, the first hole being formed by aligning first cutouts formed in corresponding laminations before stacking.

Preferably, the first cutouts are formed in an edge of the laminations, and the first hole is an open hole forming a first groove in a radially outermost surface of the corresponding pole, the first groove has a constant radial depth and a constant circumferential width along the axial direction of the rotor core.

Preferably, the rotor core defines a plurality of winding slots between the poles, each winding slot has an opening at a radially outermost end thereof, and the circumferential width of the first groove is not more than a circumferential width of the opening of the winding slot.

Alternatively, the first cutouts of the laminations are in the form of a closed hole, and the first hole is a blind hole extending in the corresponding pole.

Preferably, each pole of the rotor core comprises a rectangular neck portion and an arced head portion adjoining a radially outer end of the neck portion, the first hole is defined in the head portion.

Preferably, the rotor core defines a second hole in a second one of the poles, said second pole being further from the center line of gravity of the rotor than the first pole, the second hole extending from a second axial end of the rotor core to an axial middle portion of the rotor core, the second hole being formed by aligning second cutouts formed in corresponding laminations before stacking.

Preferably, a sum of axial lengths of the first hole and the second hole is less than an axial length of the rotor core.

Preferably, the second cutouts are formed in an edge of the corresponding laminations, and the second hole is an open hole forming a second groove in a radially outermost surface of the corresponding pole, the second groove has a constant radial depth and a constant circumferential width along the axial direction of the rotor core.

Preferably, the rotor core defines a plurality of winding slots between the poles, each winding slot has an opening at a radially outermost end thereof, and the circumferential width of the second groove is not more than a circumferential width of the opening of the winding slot.

Alternatively, the second cutouts of the laminations are in the form of a closed hole, and the second hole is a blind hole extending in the corresponding pole.

Preferably, each pole of the rotor core comprises a rectangular neck portion and an arced head portion adjoining a radially outer end of the neck portion and the second hole is defined in the head portion.

Preferably, the housing forms a part of the stator of the motor.

Embodiments of the present invention provide an electric motor which has a mounting structure formed on an end of the shaft for connection to a load where the mounting structure shifts the center of gravity from the rotational axis of the rotor, with a structure which compensates for the mounting structure to shift the center of gravity back towards the rotational axis so as to reduce the need for harsh grinding of the rotor core after assembly to restore acceptable balance of the rotor. The mounting structure may be as simple as a single flat surface cut, stamped, forged or otherwise formed at an end portion of the shaft which, by removal of material of the shaft, upsets the dynamic balance of the rotor.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
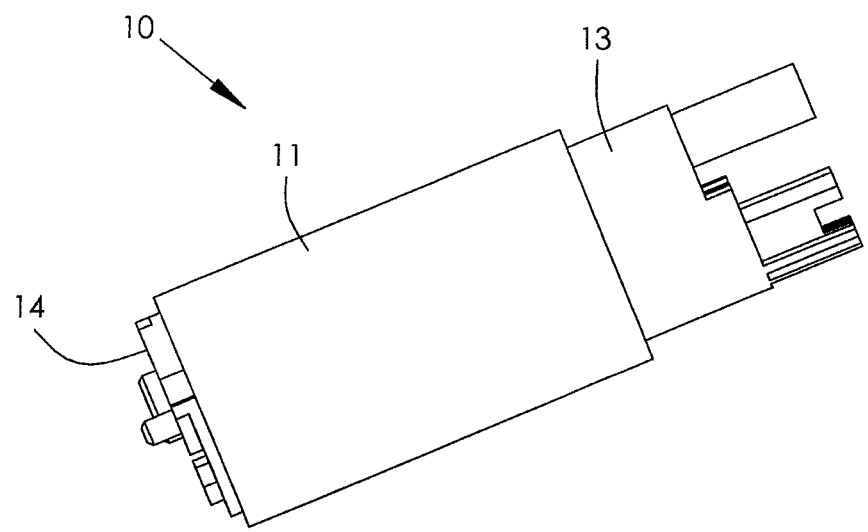
FIG. 1 illustrates a fuel pump according to an embodiment of the present invention.
Figure 2:
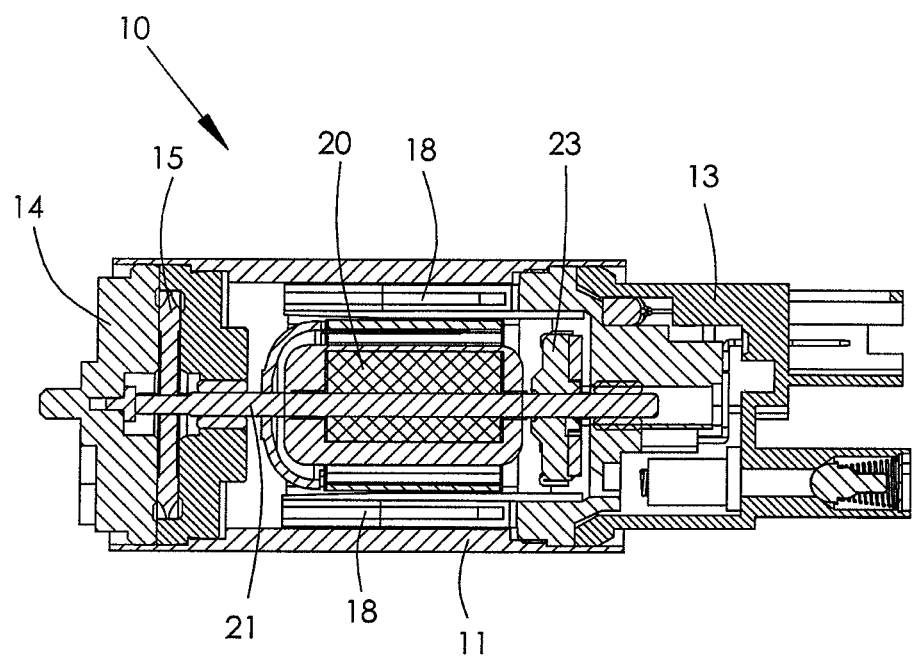
FIG. 2 is a sectional view of the fuel pump of FIG. 1.

As shown in FIGS. 1 and 2, a fuel pump 10 according to a first preferred embodiment of the present invention includes a housing 11 having first and second ends. A pump chamber 14 closes the first end of the housing 11 and an impeller 15 is disposed within the pump chamber. An end cap 13 closes the second end of the housing 11. The housing 11 forms part of a stator of a motor that drives the pump, i.e. the housing of the fuel pump also forms a housing of the motor. The stator includes a pair of permanent magnets 18 fixed to the housing. The motor includes a rotor 20 comprising a shaft 21 to which the impeller 15 is connected. During operation, the impeller 15 is rotated to drive fuel through the housing 11.

Figure 3:
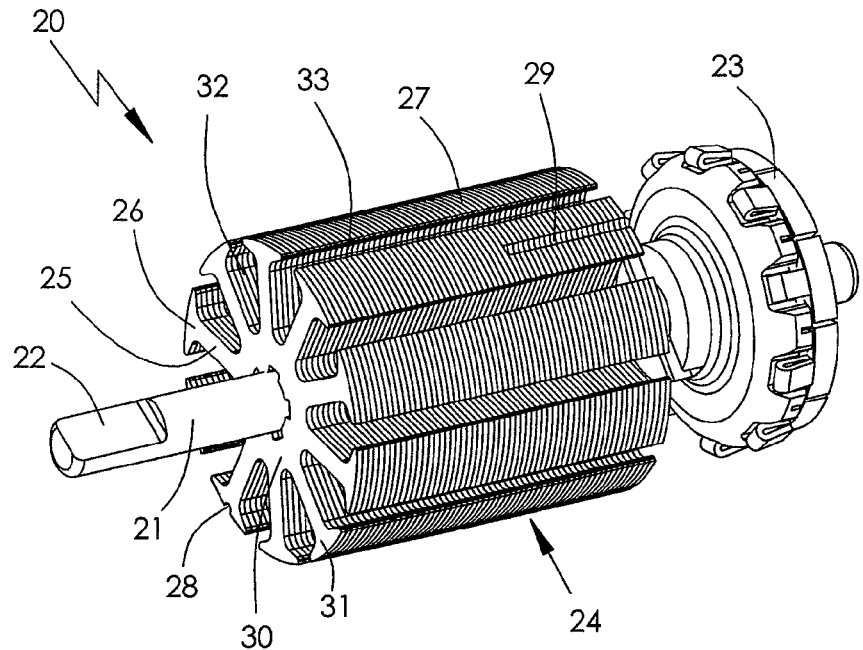
FIG. 3 is an isometric view of a rotor of the motor of FIG. 2, with windings of the rotor omitted.
Figure 4:
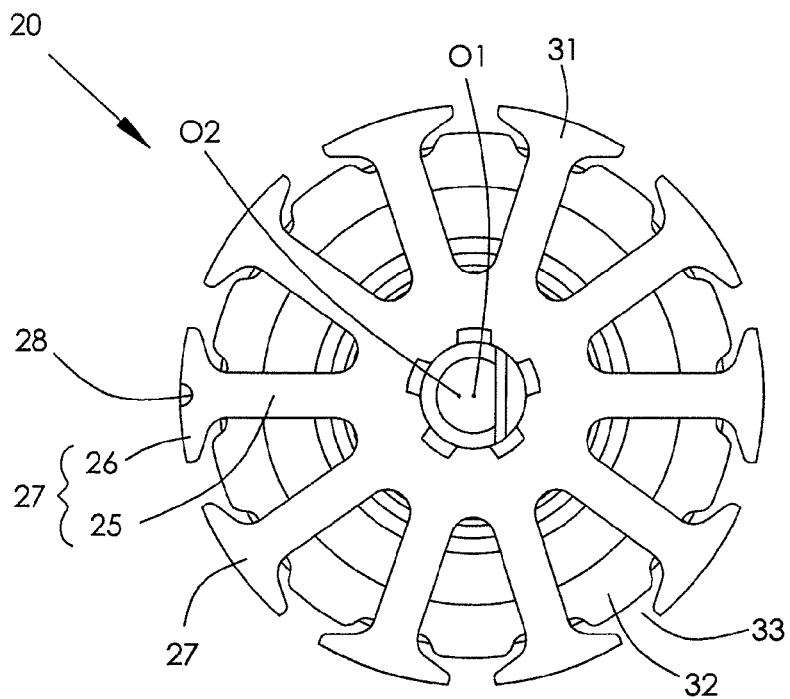
FIG. 4 is an end view of the rotor of FIG. 3.
Figure 5:
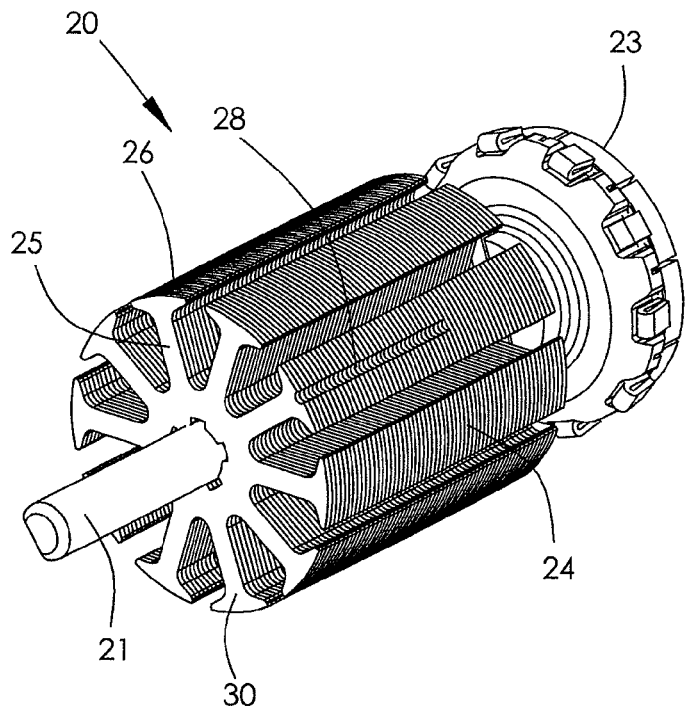
FIG. 5 is similar to FIG. 3, but viewed from another aspect.

Construction of the rotor will be described with reference to FIGS. 3 through 5. The rotor 20 includes a shaft 21, a commutator 23 and a rotor core 24 fitted to the shaft 21, and a plurality of windings (not shown) wound around the rotor core 24. The rotor core 24 is mounted on a central section of the shaft 21. The commutator 23 is arranged adjacent to a first end of the shaft 21. The impeller 15 is mounted to a second end of the shaft 21. A mounting portion 22 is formed on the second end of the shaft 21 to fix the impeller 15. In the present embodiment, the mounting portion 22 has a D shaped cross section formed by creating a flat portion on a side of the shaft, as a result, the center line of gravity O2 of the rotor 20 deviates from the rotational axis O1 of the rotor 20, which may result in vibration when the rotor is rotating.

The rotor core 24 is formed by stacking together a number of laminations 30 aligned carefully. Each of the laminations 30 includes a number of salient teeth 31 equidistantly arranged along a circumference thereof. The axially aligned teeth 31 of the laminations 30 cooperatively form a pole 27 of the rotor core 24. Each of the poles 27 includes a rectangular neck portion 25 and an arced head portion 26 adjoining a radially outer end of the neck portion 25. Each two neighboring poles 27 define a winding slot 32 there between, and the winding slot 32 has an opening 33 at a radially outermost end, between the head portions, for allowing the wire to enter into the winding slot 32 during winding of the rotor.

A first hole 28 is formed in a pole 27 that is located closest to the center line of gravity O2 of the rotor 20. Alternatively, the first groove 28 can be formed in one of three poles 27 that is located closest to the center line of gravity O2 of the rotor 20. The first hole 28 reduces the weight of a corresponding half of the rotor core 24 where the center line of gravity O2 of the rotor 20 locates, thus improving the balance of the rotor 20. The first hole 28 is an open hole forming an axially extending first groove in a radially outermost surface of the corresponding pole 27. The first hole 28 extends from a first axial end of the rotor core 24 adjacent to the mounting portion 22 to a central portion of the rotor core 24, thus the first hole 28 has an axial length less than that of the rotor core 24.

The first hole 28 is formed by aligning cutouts in corresponding laminations 30. More specifically, the corresponding laminations 30 each have a cutout forming an open hole at a radially outermost surface of a corresponding tooth before stacking, and the holes in the laminations 30 are aligned to form the first groove in the pole 27 after assembly. Preferably, the cutouts formed in the laminations by punching.

The radial depth of the first hole 28 is constant along an axial direction of the rotor core 24, and the first hole 28 has a constant circumferential width along the axial direction of the rotor core 24, such that vortex flow is avoided or reduced when fuel flows through the motor. Preferably, the circumferential width of the first hole 28 is not more than a circumferential width of the opening 33 of the winding slot 32.

A second hole 29 is formed in a pole 27 that is located farthest from the center line of gravity O2 of the rotor 20. Alternatively, the second hole 29 can be formed in one of three poles 27 that is located farthest from the center line of gravity O2 of the rotor 20. The second hole 29 is also in the form of an open hole forming a groove in the laminations at a radially outermost surface of the corresponding pole 27. The second hole 29 is also formed by aligning cutouts in corresponding laminations 30. Preferably, the cutouts are formed in the laminations by punching.

The second hole 29 extends from an opposite second axial end of the rotor core 24 remote from the mounting portion 22 of the shaft 21 to a central portion of the rotor core 24. The second hole 29 has an axial length, that is a length measured in the axial direction of the rotor core 24, less than that of the rotor core 24. Preferably, the sum of the axial lengths of the first hole 28 and the second hole 29 is less than the axial length of the rotor core 24. As the first hole 28 and the second hole 29 are substantially defined in two diametrically opposed poles 27, the center of gravity of the rotor 20 is adjusted to be closer to the geometric center of the rotor core 24, improving the balance of the rotor 20 about its rotational axis.

The radial depth of the second hole 29 is constant along the axial direction of the rotor 20, the second hole 29 has a constant circumferential width along the axial direction of the rotor 20, such that vortex flow is avoided or reduced when fuel flows through the motor. Preferably, the circumferential width of the second hole 29 is not more than the circumferential width of the opening 33 of the winding slot.

Figure 6:
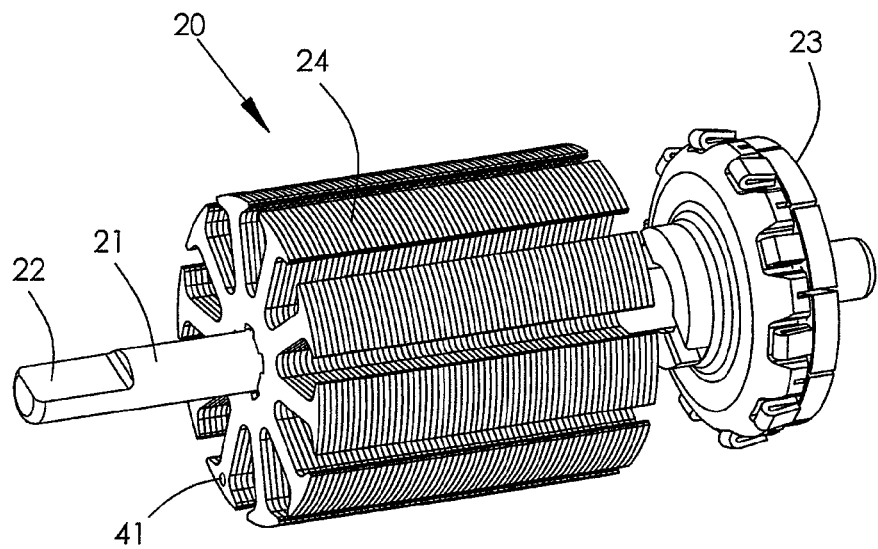
FIG. 6 shows a rotor according to another embodiment of the present invention.
Figure 7:
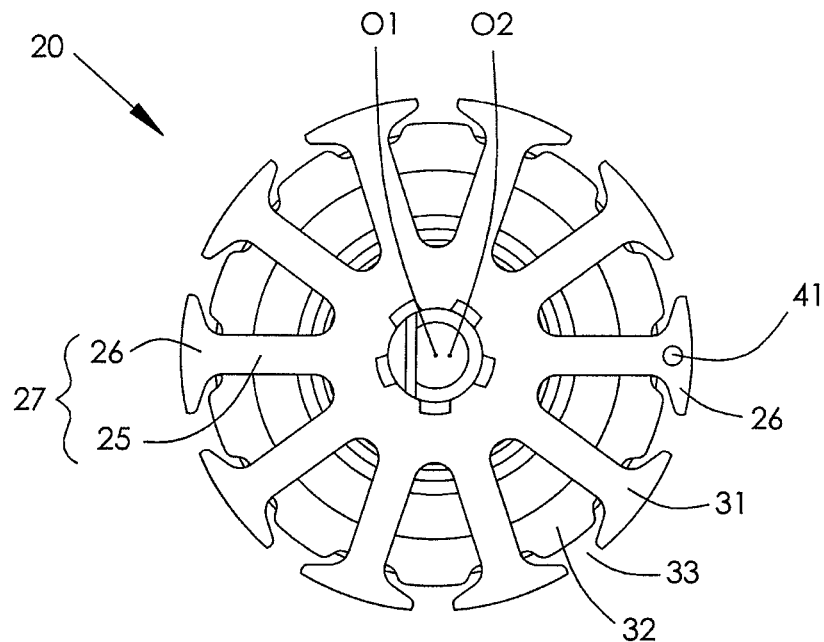
FIG. 7 is an end view of the rotor of FIG. 6.
Figure 8:
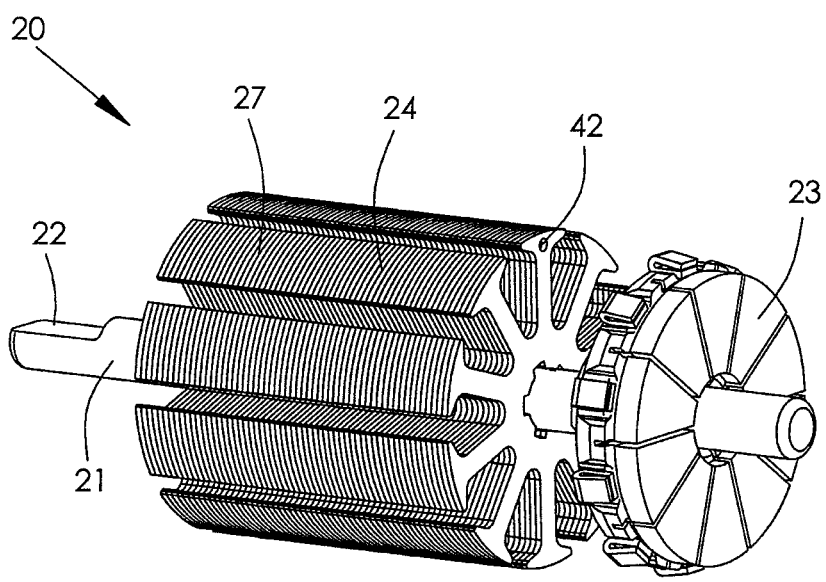
FIG. 8 shows the rotor of FIG. 6, viewed from another aspect.

FIGS. 6 through 8 show an alternative rotor 20 which differs from the above described rotor of the first embodiment as follows. The grooves in the outer surface of the poles are replaced by blind holes formed in the body of the poles. Holes 41 and 42 are blind holes formed in the head portions 26 of the respective poles 27. The first hole 41 and the second hole 42 each are spaced from the radially outermost surface of the respective pole 27, such that vortex flow is avoided during fuel flowing through the motor. More specifically, each of the first hole 41 and the second hole 42 is formed by aligning cutouts formed in corresponding laminations 30. The cutouts are in the form of closed holes formed within the body of the laminations away from the edge of the laminations. The cutout is circular in the present embodiment. One of ordinary skill in the art will realize that many other shapes could be employed. Preferably, the cutouts are formed in the laminations by punching.

The holes, whether they are grooves 28, 29 or blind holes 41, 42, represent the removal of material from the rotor core to compensate for the removal of material from one side of one end portion of the shaft to form the D-shaped coupling or mounting structure for the impeller, thus improving the balance of the rotor.

Although the invention has been described with reference to one or more preferred embodiments, it should be appreciated by those skilled in the art that various modifications are possible. Therefore, the scope of the invention is to be determined by reference to the claims that follow. For example, while the housing of the fuel pump also forms a housing for the motor, the motor may be a separate motor which is pressed into or otherwise fixed to the housing of the fuel pump.

In the description and claims of the present application, each of the verbs "comprise", "include", "contain" and "have", and variations thereof, are used in an inclusive sense, to specify the presence of the stated item but not to exclude the presence of additional items. It should be noted that, in the above description, "axial length" of the first groove or second groove relates to a length measured along a direction parallel to the rotational axis of the rotor; the item "radial depth" of the first groove or second groove relates to a depth measured along a radial direction of the rotor; and "circumferential width" of the first groove or second groove relates to a width measured along a circumferential direction of the rotor.

The invention claimed is:

1. An electric motor comprising a stator and a rotor, the rotor comprising:
   a shaft having a mounting structure formed at one end thereof for connection to a load;
   a rotor core fitted to the shaft, the rotor core formed by stacking together a plurality of laminations and having a plurality of salient poles arranged along a circumference thereof, each pole comprising a neck portion and an arced head portion; and
   a commutator fitted to the shaft;
   wherein the mounting structure causes a center line of gravity of the rotor to deviate from a rotational axis of the rotor, the rotor core defining a first hole in the head portion of a first one of the poles, said first pole being closer to the center line of gravity of the rotor than at least one other pole, the first hole extending from a first axial end of the rotor core to an axial middle portion of the rotor core, the first hole being formed by aligning first cutouts formed in corresponding laminations before stacking;
   wherein the rotor core defines a second hole in the head portion of a second one of the poles, said second pole being further from the center line of gravity of the rotor than the first pole, the second hole extending from a second axial end of the rotor core to an axial middle portion of the rotor core, the second hole being formed by aligning second cutouts formed in corresponding laminations before stacking; and
   wherein the first hole and the second hole axially extend from opposite axial ends of the rotor core in opposite directions.

2. The motor of claim 1, wherein the first cutouts are formed in an edge of the laminations, and the first hole is an open hole forming a first groove in a radially outermost surface of the first pole, the first groove has a constant radial depth and a constant circumferential width along an axial direction of the rotor core.

3. The motor of claim 2, wherein the rotor core defines a plurality of winding slots between the poles, each winding slot has an opening at a radially outermost end thereof, and the circumferential width of the first groove is not more than a circumferential width of the opening of the winding slot.

4. The motor of claim 1, wherein the first cutouts of the laminations are in the form of a closed hole, and the first hole is a blind hole extending in the corresponding pole.

5. The motor of claim 1, wherein each pole of the rotor core comprises a rectangular neck portion and an arced head portion adjoining a radially outer end of the neck portion, the first hole is defined in the head portion.

6. The motor of claim 1, wherein a sum of axial lengths of the first hole and the second hole is less than an axial length of the rotor core.

7. The motor of claim 1, wherein the second cutouts are formed in an edge of the corresponding laminations, and the second hole is an open hole forming a second groove in a radially outermost surface of the corresponding pole, the second groove has a constant radial depth and a constant circumferential width along the axial direction of the rotor core.

8. The motor of claim 7, wherein the rotor core defines a plurality of winding slots between the poles, each winding slot has an opening at a radially outermost end thereof, and the circumferential width of the second groove is not more than a circumferential width of the opening of the winding slot.

9. The motor of claim 1, wherein the second cutouts of the laminations are in the form of a closed hole, and the second hole is a blind hole extending in the corresponding pole.

10. The motor of claim 1, wherein said first pole and said second pole are diametrically opposed to each other.

11. A fuel pump comprising:
a housing;
a pump chamber received in the housing;
an impeller received in the pump chamber; and
an electric motor comprising a stator and a rotor, the rotor comprising:
a shaft having a mounting structure formed at one end thereof for connection to the impeller;
a rotor core fitted to the shaft, the rotor core formed by stacking together a plurality of laminations and having a plurality of salient poles arranged along a circumference thereof; and
a commutator fitted to the shaft;
wherein the mounting structure causes a center line of gravity of the rotor to deviate from a rotational axis of the rotor, the rotor core defining a first hole in a first one of the poles, said first pole being closer to the center line of gravity of the rotor than at least one other pole, the first hole extending from a first axial end of the rotor core to an axial middle portion of the rotor core, the first hole being formed by aligning first cutouts formed in corresponding laminations before stacking, and
wherein the rotor core defines a second hole in a second one of the poles, said second pole being further from the center line of gravity of the rotor than the first pole, the second hole extending from a second axial end of the rotor core to an axial middle portion of the rotor core, the second hole being formed by aligning second cutouts formed in corresponding laminations before stacking.

12. The fuel pump of claim 11, wherein the first cutouts are formed in an edge of the laminations, and the first hole is an open hole forming a first groove in a radially outermost surface of the first pole, the first groove has a constant radial depth and a constant circumferential width along an axial direction of the rotor core.

13. The fuel pump of claim 12, wherein the rotor core defines a plurality of winding slots between the poles, each winding slot has an opening at a radially outermost end thereof, and the circumferential width of the first groove is not more than a circumferential width of the opening of the winding slot.

14. The fuel pump of claim 11, wherein the first cutouts of the laminations are in the form of a closed hole, and the first hole is a blind hole extending in the corresponding pole.

15. The fuel pump of claim 11, wherein a sum of axial lengths of the first hole and the second hole is less than an axial length of the rotor core.

16. The fuel pump of claim 11, wherein the second cutouts are formed in an edge of the corresponding laminations, and the second hole is an open hole forming a second groove in a radially outermost surface of the corresponding pole, the second groove has a constant radial depth and a constant circumferential width along the axial direction of the rotor core.

17. The fuel pump of claim 16, wherein the rotor core defines a plurality of winding slots between the poles, each winding slot has an opening at a radially outermost end thereof, and the circumferential width of the second groove is not more than a circumferential width of the opening of the winding slot.

18. The fuel pump of claim 11, wherein the second cutouts of the laminations are in the form of a closed hole, and the second hole is a blind hole extending in the corresponding pole.

19. The fuel pump of claim 11, wherein the housing forms a part of the stator of the motor.

20. The fuel pump of claim 11, wherein said first pole and said second pole are diametrically opposed to each other.

* * * * *